United States Patent
Kappel et al.

(10) Patent No.: US 8,172,100 B2
(45) Date of Patent: May 8, 2012

(54) NACELLE TRAVELLING CRANE

(75) Inventors: Lars Vinther Kappel, Arhus C (DK);
Michael Christensen, Silkeborg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 13/000,911

(22) PCT Filed: Jun. 26, 2009

(86) PCT No.: PCT/DK2009/050146
§ 371 (c)(1),
(2), (4) Date: Feb. 21, 2011

(87) PCT Pub. No.: WO2009/155934
PCT Pub. Date: Dec. 30, 2009

(65) Prior Publication Data
US 2011/0135478 A1    Jun. 9, 2011

(30) Foreign Application Priority Data
Jun. 27, 2008    (DK) .................................. 2008 00889

(51) Int. Cl.
*B66C 11/02*    (2006.01)
(52) U.S. Cl. ....................................... 212/323; 212/225
(58) Field of Classification Search .......... 212/223–228, 212/253, 312, 323
See application file for complete search history.

(56) References Cited

U.S. PATENT DOCUMENTS

| | | | | |
|---|---|---|---|---|
| 758,399 | A | * | 4/1904 | Wilke .............................. 104/98 |
| 837,586 | A | * | 12/1906 | Selleck ....................... 414/142.7 |
| 4,502,527 | A | * | 3/1985 | Brewer ......................... 164/418 |

FOREIGN PATENT DOCUMENTS

| | | | |
|---|---|---|---|
| CH | 653 524 A5 | * | 1/1986 |
| DE | 29 00 486 | | 7/1980 |
| DE | 37 31 631 | | 4/1989 |
| DE | 201 14 909 | | 5/2002 |
| SU | 744095 B | * | 6/1980 |
| WO | 2006/062414 | | 6/2006 |
| WO | 2007107817 | | 9/2007 |

OTHER PUBLICATIONS

Carsten Nielsen; 1st Technical Examination Report issued in Denmark priority application No. PA 2008 00889; Feb. 6, 2009; 4 pages; Denmark Patent and Trademark Office.

(Continued)

*Primary Examiner* — Emmanuel M Marcelo
(74) *Attorney, Agent, or Firm* — Wood, Herron & Evans, L.L.P.

(57) ABSTRACT

The present invention relates to an overhead travelling crane (2) for a nacelle (1) of a wind turbine, said travelling crane comprising at least a first suspension beam (3); a second suspension beam (4), said suspension beams being arranged with a space between them; a cross beam (5), said cross beam being movably connected to said first and second suspension beams so that the cross beam can be moved along the suspension beams; and at least one lifting device (6), said lifting device being movably connected to the cross beam. Said first and second suspension beams are parts of concentric circles, said -concentric circles sharing the same center and having different radii. The cross beam may be inclined.

9 Claims, 5 Drawing Sheets

OTHER PUBLICATIONS

Bruce Sheppard; International Search Report issued in priority application No. PCT/DK20091050146; Nov. 12, 2009; 9 pages; European Patent Office.

Nora Lindner; International Preliminary Report on Patentability issued in international priority application No. PCT/DK2009/050146; Jan. 13, 2011; 6 pages; The International Bureau of WIPO.

* cited by examiner

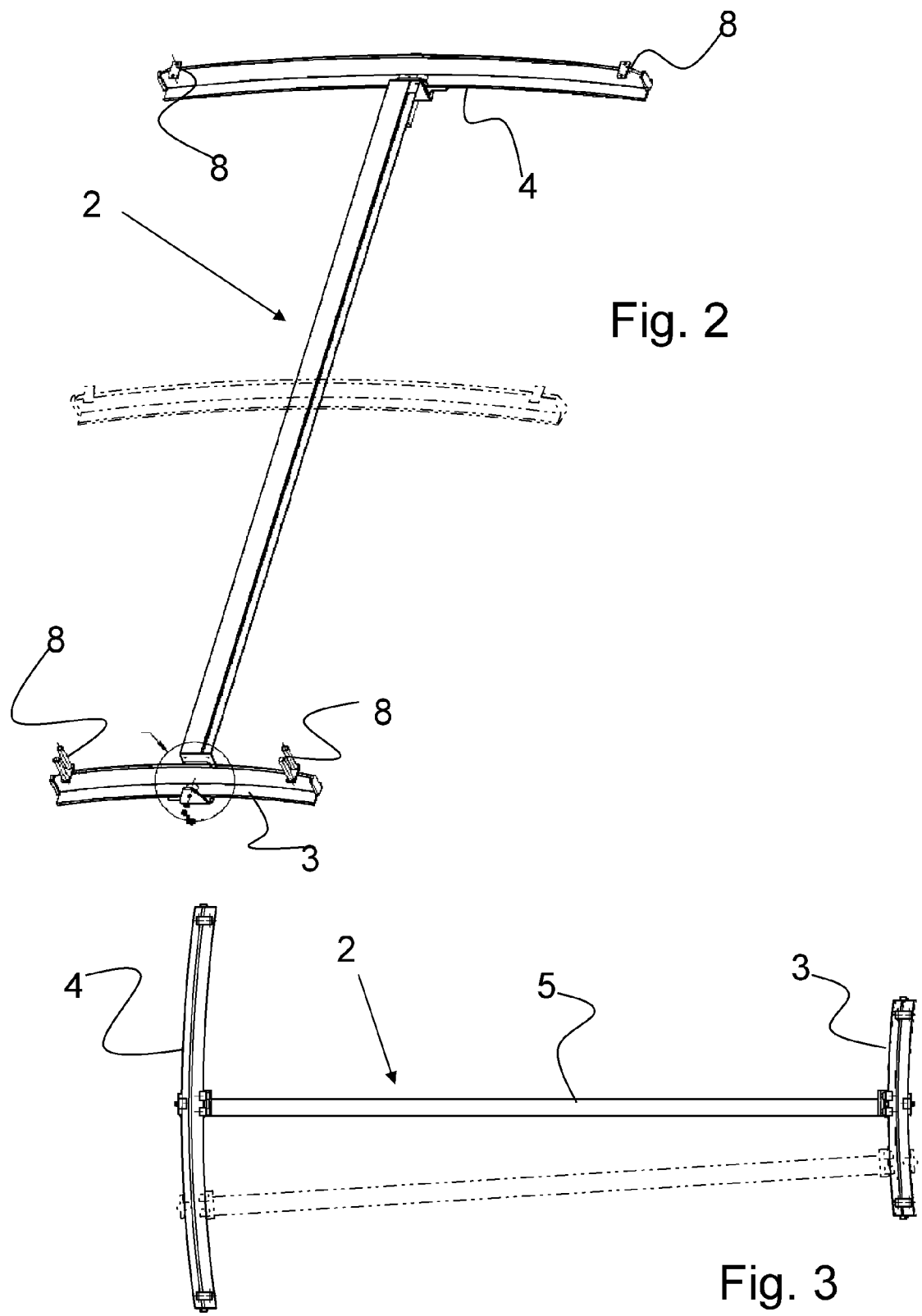

NACELLE TRAVELLING CRANE

TECHNICAL FIELD OF THE INVENTION

The present invention relates to an overhead travelling crane for a nacelle of a wind turbine. The invention also relates to a wind turbine.

BACKGROUND ART

The nacelle of a wind turbine is a confined area which comprises several heavy wind turbine components, such as gears, shafts, generators, etc., which from time to time need maintenance, repair, or even replacement, wherefore internal lifting equipments are arranged in connection with the nacelle for supporting said handling.

For instance an internal travelling crane is known in the prior art. The crane consists of two suspension rails, which are connected to the nacelle. In relation to the rails, a movable cross beam is arranged, and a hoisting device is arranged movably on the cross beam. The two suspension rails are arranged at each end of the nacelle so that they are parallel in relation to each other. Accordingly, the cross beam extends between and is movably coupled to the two suspension rails so that the cross beam can be moved along a longitudinal extension of the suspension rails.

Often the nacelle is not completely rectangular in shape, whereby some of the area below the crane is not covered by the crane, and thereby the handling of the equipment in these areas is difficult. In the prior art, this is partly solved by the cross beam being rotatable about a vertical axis of the movable couplings to the suspension rails so that the cross beam can extend between the suspension rails in an angle different from 90 degrees. However, since the necessary length of the cross beam may vary according to the extension angle, the cross beam is arranged displaceable in one of the movable couplings. This has the consequence that space has to be arranged on the opposite side of one of the suspension rails so that the cross beam can extend beyond the suspension rail when the cross beam is placed in the shortest distance between the two suspension rails, whereby some of the areas in the nacelle are not covered by the crane.

Also, since the above-mentioned cross beam is displaceable and is rotatable about vertical axis of the movable couplings to the suspension rails, it has been observed that during use of the crane and especially in circumstances wherein the cross beam extends with an angle different from 90 degrees as well as being exerted for load, the cross beam may have a tendency for tilting whereby the movable couplings also may be exerted with unintended forces which may have the disadvantages that the movable couplings cannot move along the suspension rails as intended. This reduces the reliability of the crane.

It is furthermore known to have a crane structure wherein one suspension beam is curved and the other suspension is a linear beam. The cross beam is in this known crane structure movably connected to the curved suspension beam and is stationary, hingedly connected to the linear beam and is adapted to rotate about said hinge. Since the cross beam is stationary, hingedly connected to the linear beam, the crane structure has the disadvantage that it does not cover the entire area of the nacelle.

SUMMARY OF THE INVENTION

An object of the present invention is to wholly or partly overcome the above disadvantages and drawbacks of the prior art. More specifically, it is an object to provide a simple overhead travelling crane which easily may be incorporated in existing and new nacelles.

It is also an object of the present invention to provide an overhead travelling crane which has a simple construction and is reliable during use and while exerted with loads.

Another object of the present invention is to provide an overhead travelling crane which is flexible and which can cover substantially the entire area of the nacelle.

A further object of the present invention is to provide an overhead travelling crane which has a small overall height.

The above objects, together with numerous other objects, advantages and features, which will become evident from the below description, are accomplished by a solution in accordance with the present invention by said travelling crane comprising at least a first suspension beam, a second suspension beam, said suspension beams being arranged with a space between them, a cross beam, said cross beam being movably connected to said first and second suspension beams so that the cross beam can be moved along the suspension beams, and at least one lifting device, said lifting device being movably connected to the cross beam, wherein said first and second suspension beams are parts of concentric circles, said concentric circles sharing the same centre and having different radii.

The matter is that the parts of concentric circles share the same centre and have different radii. Hereby, at anytime during its movement along the beams, the cross beam will be perpendicular to both of the suspension beams, whereby the tendency of the cross beam to tilt and thereby to exert unintended forces to the movable connections between the suspension beams and the cross beam substantially is avoided. Also, the use of displaceable arrangements for the cross beam as well as the use of rotatable, movable couplings between the suspension beams and the cross beam are avoided. Furthermore, it is obtained that the travelling crane substantially may cover the entire area of the nacelle which provides flexible internal crane solution to the nacelle, which at the same time is reliable during use.

In an aspect of the present invention, the radius of the part of the circle of the second suspension beam may be larger than the radius of the part of the circle of the first suspension beam. The lengths of the radii of the concentric circles may advantageously be optimized in view of the size of the nacelle so that it is secured that the cross beam can be moved perpendicularly to the suspension beams.

In an aspect of the present invention, the suspension beams may be connected to a top part of the nacelle. Hereby it is obtained that the crane of the present invention can be placed as close to the top of the nacelle as possible whereby as much as possible of the headroom in the nacelle may be used for lifting height. The suspension beams may be connected in either an underhung or overhung manner in relation to the top part of the nacelle. The term "top part" is in this context to be construed as the roof or top of the nacelle, or the top sides of the nacelle.

In an aspect of the present invention, a first longitudinal extension of the first suspension beam may be smaller than a second longitudinal extension of the second suspension beam. This is expedient when the nacelle is not of a rectangular configuration, so that the travelling crane of the present invention can be optimized to cover the largest possible area of the nacelle.

In an aspect of the present invention, the first suspension beam may be arranged in a vertical height different from the second suspension beam so that the cross beam has an inclined extension. This is expedient when the nacelle has a slanting roof or top, so that the travelling crane of the present invention can be placed as close to the top of the nacelle as possible whereby as much as possible of the headroom in the nacelle may be used for lifting.

In an aspect of the present invention, braking means (shown schematically in FIG. 7) may be arranged in relation to the lifting device and the cross beam and/or the cross beam and the suspension beams. Especially, when the cross beam is inclined due to the suspension beams being arranged at different heights, it is advantageous to have braking means arranged for controlling movement of the lifting device along the cross beam.

In an aspect of the present invention, a plurality of cross beams (additional cross beam shown in phantom in FIG. 3) may be arranged adjacent to each other and may be movably connected to the suspension beams. Hereby it is obtained that the travelling crane may operate more flexibly in the entire area of the nacelle. The plurality of cross beams may for instance cooperate in a common lifting assignment or they may be used separately for individual lifting assignments, so that more separate parts of the nacelle may be lifted at the same time.

In an aspect of the present invention, a plurality of lifting devices (additional lifting device shown in phantom in FIG. 8) may be movably connected to the cross beam(s). Hereby it is obtained that the travelling crane may operate more flexibly in the entire area of the nacelle. The plurality of lifting devices may for instance cooperate in a common lifting assignment or they may be used separately for individual lifting assignments, so that more separate parts of the nacelle may be lifted at the same time.

In an aspect of the present invention, a third suspension beam (shown in phantom in FIG. 2) may be arranged at a distance from the first suspension beam in the space between the first and the second suspension beams, the cross beam being movably connected to said third suspension beam. Hereby it is obtained that the cross beam is additionally suspended as well as supported, whereby the lifting capacity of the travelling crane may be increased. Within the wind turbine technology, there is a tendency that the capacities as well as the sizes of the wind turbines increase and as the wind turbines are becoming larger, the sizes as well as weights of the parts placed in the nacelle also increase, whereby the third suspension beam may facilitate lifting of the parts of the nacelle. Advantageously, the third suspension beam is as well a part of the concentric circles as the suspension beams, sharing the same centre but having a different radius in relation to the radii of the first and second suspension beams. The placement of the third suspension beam and the distance from the first suspension beam, and thereby the additional support of the crane, may be chosen in view of the load distribution in the nacelle.

The present invention also relates to a wind turbine comprising an overhead travelling crane according to any of the above-mentioned features.

BRIEF DESCRIPTION OF THE DRAWINGS

The invention and its many advantages will be described in more detail below with reference to the accompanying schematic drawings, which for the purpose of illustration show some non-limiting embodiments and in which FIG. 2 shows an embodiment of the travelling crane in a perspective view, FIG. 3 shows the travelling crane of FIG. 2 in a top view.

All the figures are highly schematic and not necessarily to scale, and they show only parts which are necessary in order to elucidate the invention, other parts being omitted or merely suggested.

DESCRIPTION OF PREFERRED EMBODIMENTS

Figure 1:
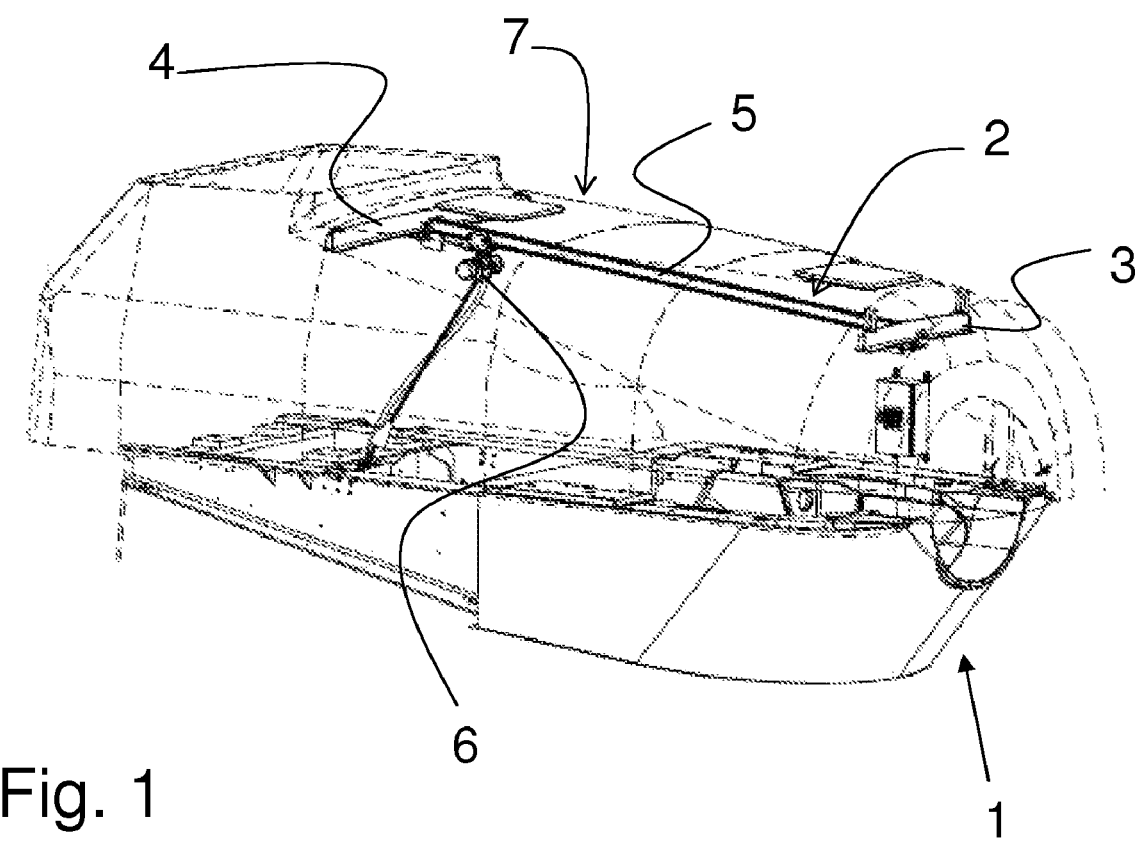
FIG. 1 shows a nacelle of a wind turbine, wherein an overhead travelling crane is arranged.

In FIG. 1, a nacelle 1 of a wind turbine (not shown) is shown in a perspective view. At the top of the nacelle 1, an overhead travelling crane 2 is shown mounted internally in the nacelle 1. The travelling crane 2 comprises in this embodiment a first suspension beam 3, having a first longitudinal extension, and a second suspension beam 4, having a second longitudinal extension, said suspension beams 3, 4 being arranged with a space between them. Furthermore, a cross beam 5 is movably connected to said first 3 and second 4 suspension beams so that the cross beam 5 can be moved along the first and second longitudinal extensions of the suspension end beams 3, 4. Also, a lifting device 6 is movably connected to the cross beam 5. According to the invention, the first and second longitudinal extensions of the suspension beams 3, 4 are parts of concentric circles (not shown).

The nacelle 1 shown in FIG. 1 has a slanting roof or top 7, whereby the first suspension beam 3 is placed below the second suspension beam 4 so that the cross beam slopes. In the other not shown embodiments the cross beam may slope from the first beam towards the second beam, and in yet another not shown embodiment the cross beam may be horizontal.

In FIG. 2, an embodiment of the overhead travelling crane 2 is shown. In this embodiment, the first and second suspension beams 3, 4 are made by an inverted T-profile. At each end of the suspension beams 3, 4, connection means 8 are arranged for connecting the travelling crane 2 directly to the nacelle or indirectly via an intermediate support structure (not shown). The connection means 8 are in this embodiment flat iron, which either is bolted or welded to the suspension beams so that the travelling crane 2 substantially may be connected to the top of the nacelle without any space between the nacelle and the crane. Hereby the use of the height of the inside of the nacelle is optimised. The cross beam 5 is in this embodiment an I-profile and is movably connected the suspension beams 3, 4 from below, which will be further described in connection with FIGS. 4 to 6 below.

In FIG. 3, the travelling crane 2 of FIG. 2 is shown in a top view. From this view, it is seen that the first suspension beam 3 and the second suspension beam 4 are parts of concentric circles, said circles sharing the same centre and having different radii. It is hereby obtained that the cross beam 5, when it moves along the suspension beams 3, 4, substantially, always is perpendicular to both suspension beams 3, 4.

Figure 4:
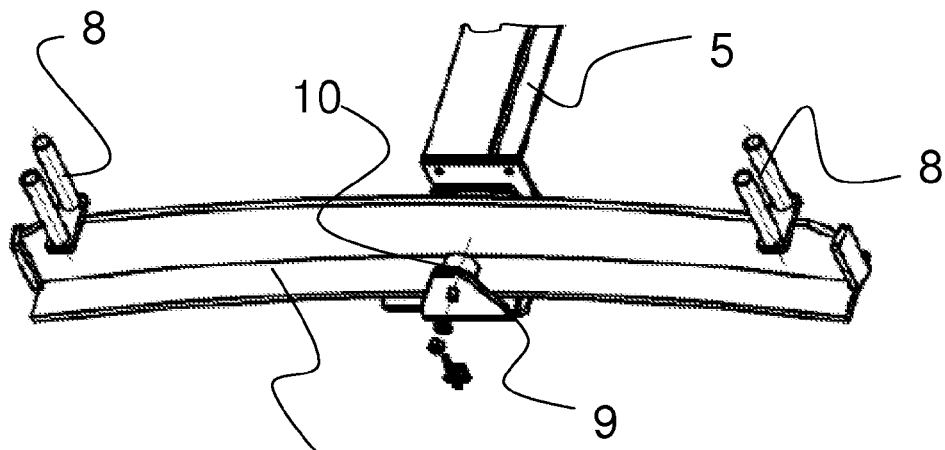
FIG. 4 shows a part of the travelling crane of FIG. 2, wherein the movable connection between the cross beam and the first suspension beam is shown in a perspective view.
Figure 5:
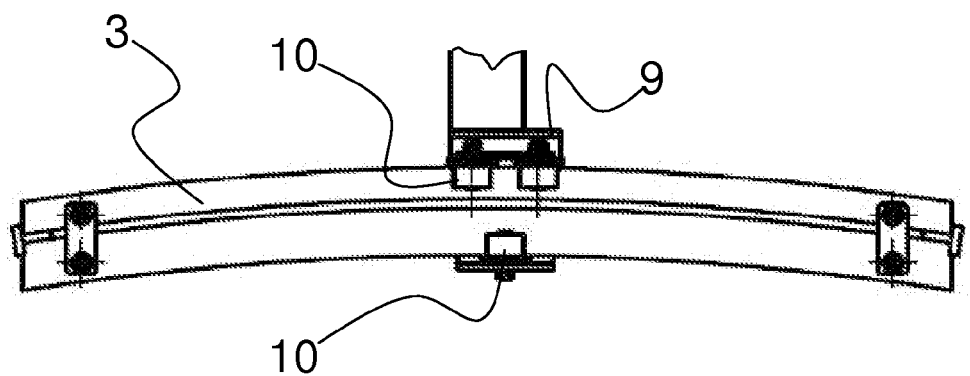
FIG. 5 shows the movable connection of FIG. 4 in a top view.
Figure 6:
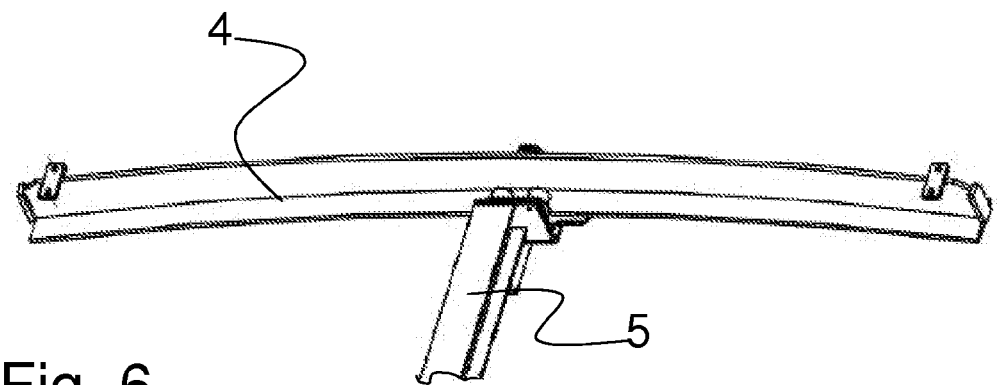
FIG. 6 shows a part of the travelling crane of FIG. 2, wherein the movable connection between the cross beam and the second suspension beam is shown in a perspective view.

In FIG. 4, a part of the travelling crane of FIG. 2, wherein the movable connection 9 between the cross beam 5 and the first suspension beam 3 is shown in a perspective view. The movable connection 9 is in this embodiment shown in the form of carriage having three wheels 10, said wheels being distributed with two on the one side of the first suspension beam 3 and one on the other side. The two wheels are placed towards the cross beam 5. In this embodiment, the cross beam 5 is connected to the suspension beams from below so that the overall height of the travelling crane is minimized. In FIG. 5, the movable connection 9 is shown in a top view. From this figure, it is seen that the wheels 10 roll along the suspension beam 3 on the flange of the inverted T-profile. FIG. 6 shows the movable connection 9 between the cross beam 5 and the second suspension beam 4.

Figure 7:
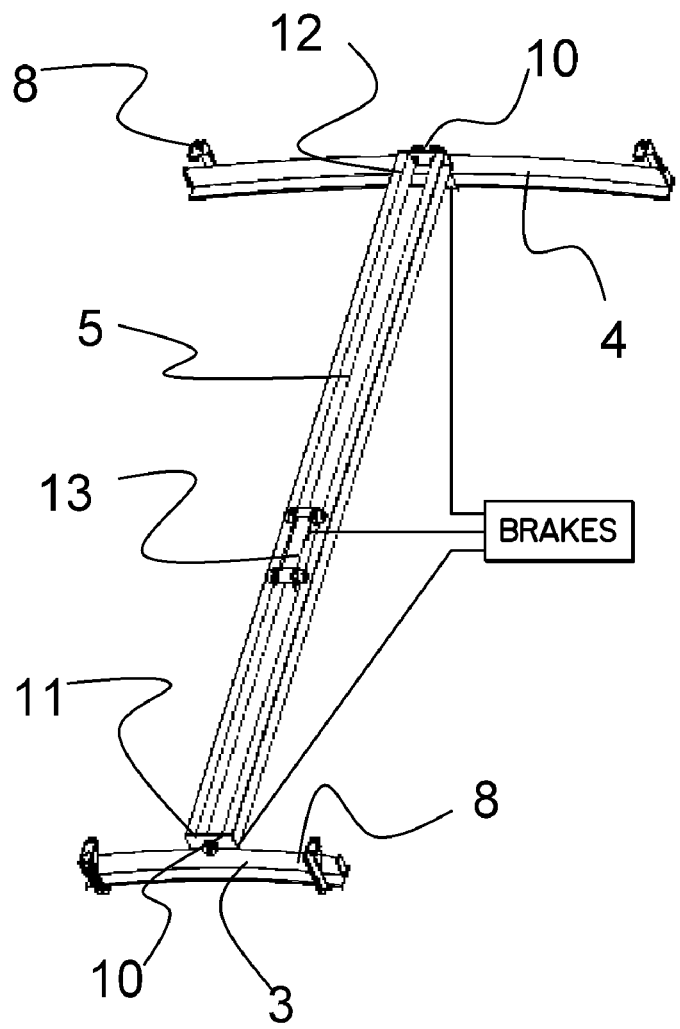
FIG. 7 shows another embodiment of the travelling crane in a perspective view.
Figure 8:
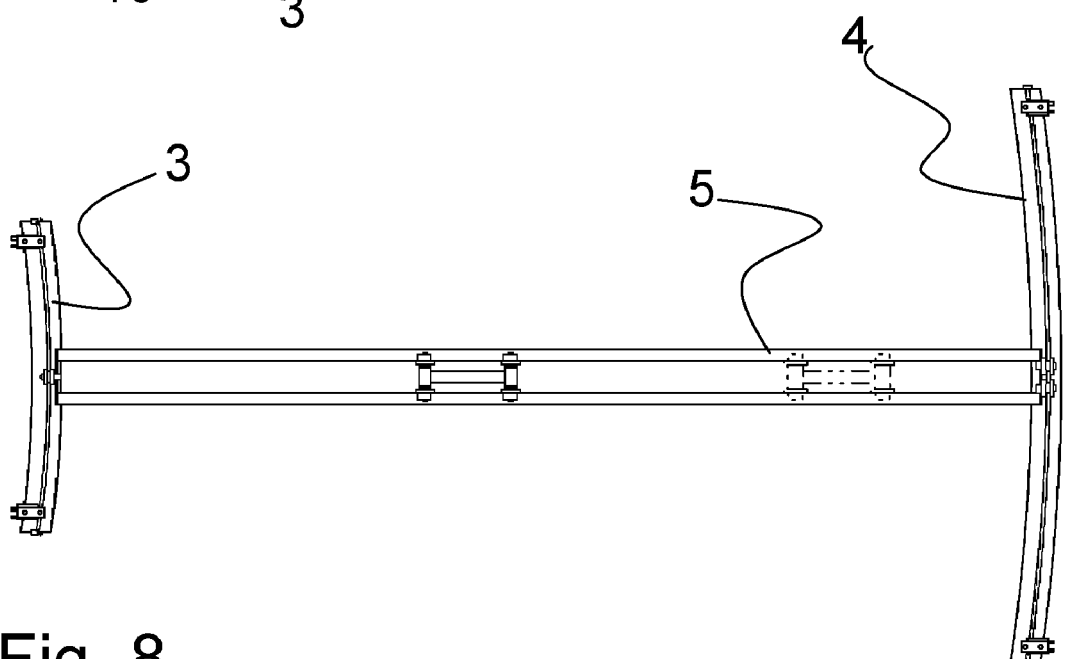
FIG. 8 shows the travelling crane of FIG. 7 in a top view.
Figure 9:
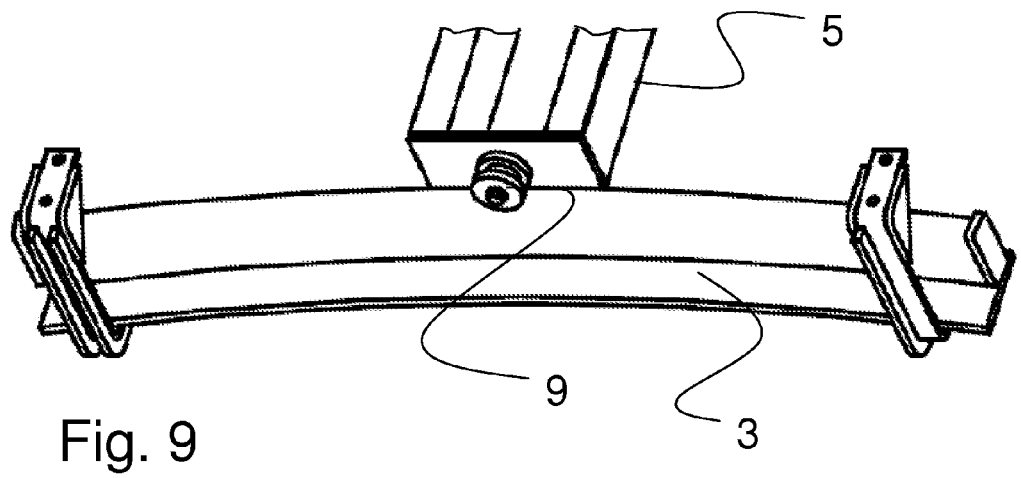
FIG. 9 shows a part of the travelling crane of FIG. 7, wherein the movable connection between the cross beam and the first suspension beam is shown in a perspective view.

In FIGS. 7 to 11, another embodiment of the travelling crane 2 is shown. In this embodiment, the suspension beams 3, 4 are also made of inverted T-profiles. The cross beam 5 comprises in this embodiment two connected inverted T-profiles, c.f. FIG. 9. The cross beam 5 has at its first end 11 one wheel 10 and at the second end 12 two wheels 10. The wheels 10 are arranged with circumferential grooves, which are adapted to engage to the body of the inverted T-profile of the suspension beam 3, 4 from above. Since the cross beam 5 in this embodiment is movably connected to the suspension beams from above, the connection means 8 have an extension, so that the crane 2 when mounted in the nacelle is lowered from the top of the nacelle.

The lifting device (not shown) is in this embodiment movably connected to the cross beam 5 via a wagon 13. The wagon 13 comprises 4 wheels, which are formed in the same manner as described above and thereby are adapted to engage with the bodies of the two inverted T-profiles of the cross beam 5.

In FIG. 8, the travelling crane is shown in a top view.

Figure 10:
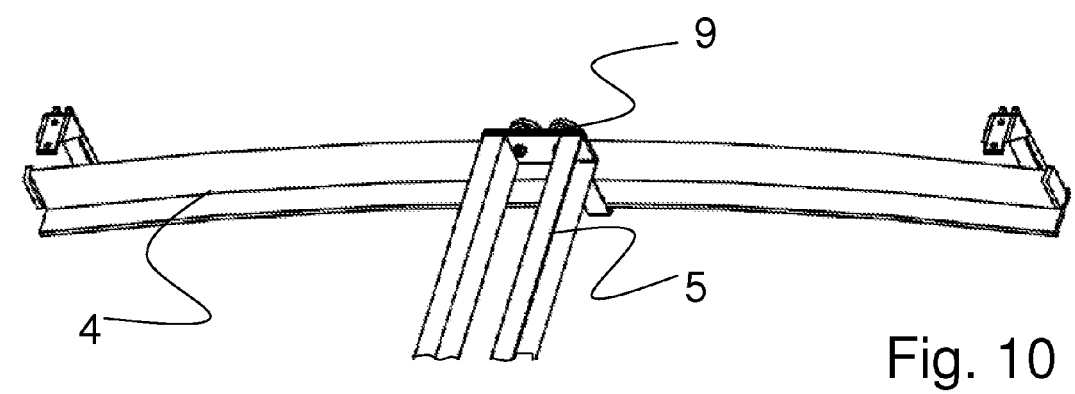
FIG. 10 shows the part of the travelling crane of FIG. 7, wherein the movable connection between the cross beam and the second suspension beam is shown in a perspective view.

In FIG. 9, the movable connection 9 between the cross beam 5 and the first suspension beam 3 is shown. In this embodiment, the cross beam 5 comprises one wheel. In FIG. 10, the movable connection 9 between the cross beam 5 and the second suspension beam 4, which has two wheels is shown.

Figure 11:
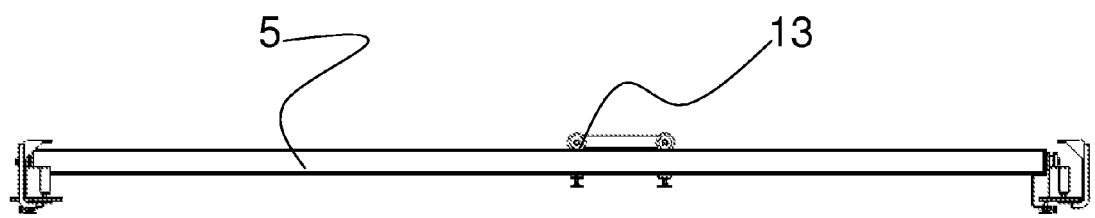
FIG. 11 shows the travelling crane of FIG. 7 in a side view.

FIG. 11 shows the travelling crane of FIG. 7 in a side view. In this embodiment the wagon 13 is movably connected to the cross beam 5 from above.

Although the invention above has been described in connection with preferred embodiments of the invention, it will be evident for a person skilled in the art that several modifications are conceivable without departing from the invention as defined by the following claims.

The invention claimed is:

1. A wind turbine having a nacelle in which is arranged an overhead traveling crane, said travelling crane comprising at least a first suspension beam, a second suspension beam, said suspension beams being arranged with a space between them, a cross beam, said cross beam being movably connected to said first and second suspension beams so that the cross beam can be moved along the suspension beams; and at least one lifting device, said lifting device being movably connected to the cross beam, wherein said first and second suspension beams are parts of concentric circles, said concentric circles sharing the same centre and having different radii.

2. The wind turbine according to claim 1, wherein the radius of the part of the circle of the second suspension beam is larger than the radius of the part of the circle of the first suspension beam.

3. The wind turbine according to claim 1, wherein the suspension beams are connected to a top part of the nacelle.

4. The wind turbine according to claim 1, wherein a longitudinal extension of the first suspension beam is smaller than a second longitudinal extension of the second suspension beam.

5. The wind turbine according to claim 1, wherein the first suspension beam is arranged in a vertical height different from the second suspension beam so that the cross beam has an inclined extension.

6. The wind turbine according to claim 1, wherein at least one brake is arranged in relation to the lifting device and the cross beam and/or the cross beam and the suspension beams.

7. The wind turbine according to claim 1, wherein a plurality of cross beams are arranged adjacent to each other and are movably connected to the suspension beams.

8. The wind turbine according to claim 1, wherein a plurality of lifting devices are movably connected to the cross beam(s).

9. The wind turbine according to claim 1, wherein a third suspension beam is arranged at a distance from the first suspension beam in the space between the first and the second suspension beams, the cross beam being movably connected to said third suspension beam.

\* \* \* \* \*